(12) United States Patent
Leigh et al.

(10) Patent No.: US 7,306,644 B2
(45) Date of Patent: Dec. 11, 2007

(54) GAS GENERATING SYSTEM AND METHOD FOR INERTING AIRCRAFT FUEL TANKS

(75) Inventors: James E. Leigh, Palos Verdes, CA (US); Kader A. Fellague, Redondo Beach, CA (US); Giorgio C. Isella, Culver City, CA (US); Paul J. Roach, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/422,839

(22) Filed: Jun. 7, 2006

(65) Prior Publication Data

US 2007/0000380 A1 Jan. 4, 2007

Related U.S. Application Data

(63) Continuation of application No. 10/727,229, filed on Dec. 2, 2003, now Pat. No. 7,081,153.

(51) Int. Cl.
*B01D 53/02* (2006.01)

(52) U.S. Cl. ............................... 95/14; 95/130; 96/112; 96/126; 96/135; 244/135 R

(58) Field of Classification Search .................... 95/14, 95/15, 22, 130; 96/121, 126, 130, 112, 114, 96/135; 244/135 R
See application file for complete search history.

(56) References Cited

U.S. PATENT DOCUMENTS

| 405,597 | A | 6/1889 | Raftery |
|---|---|---|---|
| 3,140,931 | A | 7/1964 | McRobbie |
| 3,389,972 | A | 6/1968 | Pottharst, Jr. |
| 3,464,801 | A | 9/1969 | Barstow |
| 3,590,559 | A | 7/1971 | Bragg |
| 3,628,758 | A | 12/1971 | Nichols |
| 3,691,730 | A | 9/1972 | Hickey et al. |
| 3,693,915 | A | 9/1972 | Ulanovsky |
| 3,710,549 | A | 1/1973 | Nichols et al. |
| 3,732,668 | A | 5/1973 | Nichols |
| 3,777,928 | A | 12/1973 | Kober |

(Continued)

FOREIGN PATENT DOCUMENTS

EP 0867 367 A2 9/1998

(Continued)

OTHER PUBLICATIONS

Croft, John, "FAA 'Breakthrough': Onboard Inerting", *Aviation Week & Space Technology*, Jan. 6, 2003.

*Primary Examiner*—Robert A. Hopkins
(74) *Attorney, Agent, or Firm*—Oral Caglar, Esq.

(57) ABSTRACT

The present invention provides a system and method for generation of nitrogen enriched air for inerting aircraft fuels tanks. One embodiment of the present invention includes a duct assembly; a primary heat exchanger; a gas generating system heat exchanger; a first temperature sensor; a second temperature sensor; a controller monitor; a valve; an air separation module assembly having a primary module and a secondary module; at least one flow control orifice; and a pressure sensor. The present invention utilizes a minimal complement of components and streamlined processes, thus minimizing structural and operational costs while optimizing performance and safety features.

6 Claims, 3 Drawing Sheets

U.S. PATENT DOCUMENTS

| | | |
|---|---|---|
| 3,788,039 A | 1/1974 | Bragg |
| 3,788,040 A | 1/1974 | Bragg et al. |
| 3,797,263 A | 3/1974 | Shahir et al. |
| 3,838,576 A | 10/1974 | Geffs |
| 3,847,298 A | 11/1974 | Hamilton |
| 3,850,001 A | 11/1974 | Locke |
| 3,891,411 A | 6/1975 | Meyer |
| 3,905,773 A | 9/1975 | Brooks et al. |
| 3,948,626 A | 4/1976 | Bragg |
| 4,287,170 A | 9/1981 | Erickson |
| 4,348,213 A | 9/1982 | Armond |
| 4,378,920 A | 4/1983 | Runnels et al. |
| 4,508,548 A | 4/1985 | Manatt |
| 4,556,180 A | 12/1985 | Manatt |
| 4,681,602 A | 7/1987 | Glenn et al. |
| 4,729,879 A | 3/1988 | Black |
| 4,781,907 A | 11/1988 | McNeill |
| 4,827,716 A | 5/1989 | Vershure, Jr. |
| 4,871,379 A | 10/1989 | Edwards |
| 4,894,068 A | 1/1990 | Rice |
| 4,925,057 A | 5/1990 | Childress et al. |
| 4,950,315 A | 8/1990 | Gollan |
| 5,004,482 A | 4/1991 | Haas et al. |
| 5,013,331 A | 5/1991 | Edwards et al. |
| 5,069,692 A | 12/1991 | Grennan et al. |
| 5,098,457 A | 3/1992 | Cheung et al. |
| 5,169,415 A | 12/1992 | Roettger et al. |
| 5,185,139 A | 2/1993 | Krishnamurthy et al. |
| 5,226,931 A | 7/1993 | Combier |
| 5,284,506 A | 2/1994 | Barbe |
| 5,302,189 A | 4/1994 | Barbe et al. |
| 5,305,610 A | 4/1994 | Bennett et al. |
| 5,378,263 A | 1/1995 | Prasad |
| 5,388,413 A | 2/1995 | Major et al. |
| 5,411,662 A | 5/1995 | Nicolas, Jr. |
| 5,439,507 A | 8/1995 | Barbe et al. |
| 5,456,064 A | 10/1995 | Graves |
| 5,470,379 A | 11/1995 | Garrett |
| 5,472,480 A | 12/1995 | Barbe |
| 5,496,388 A | 3/1996 | Tellier |
| 5,507,855 A | 4/1996 | Barry |
| 5,531,220 A | 7/1996 | Cassidy |
| 5,588,984 A | 12/1996 | Verini |
| 5,607,903 A | 3/1997 | Bastos |
| 5,611,218 A | 3/1997 | Naumovitz |
| 5,688,306 A | 11/1997 | Verini |
| 5,730,780 A | 3/1998 | Booth, III |
| 5,809,999 A | 9/1998 | Lang |
| 5,829,272 A | 11/1998 | Barry |
| 5,902,379 A | 5/1999 | Phillips et al. |
| 5,918,679 A | 7/1999 | Cramer |
| 5,944,874 A | 8/1999 | Prasad et al. |
| 6,012,533 A | 1/2000 | Cramer |
| 6,132,693 A | 10/2000 | Gruenwald et al. |
| 6,136,267 A | 10/2000 | Bergman |
| 6,139,604 A | 10/2000 | Gottzmann et al. |
| 6,182,714 B1 | 2/2001 | Ginsburgh et al. |
| 6,197,090 B1 | 3/2001 | Yamashita et al. |
| 6,257,341 B1 | 7/2001 | Bennett |
| 6,293,997 B1 | 9/2001 | Verbockhaven et al. |
| 6,319,305 B1 | 11/2001 | Phillips et al. |
| 6,343,462 B1 | 2/2002 | Drnevich et al. |
| 6,343,465 B1 | 2/2002 | Martinov |
| 6,360,730 B1 | 3/2002 | Koethe |
| 6,487,877 B1 | 12/2002 | Griffiths et al. |
| 6,491,739 B1 | 12/2002 | Crome et al. |
| 6,527,228 B2 | 3/2003 | Mitani |
| 6,739,359 B2 * | 5/2004 | Jones et al. .................. 141/64 |
| 7,152,635 B2 * | 12/2006 | Moravec et al. ............. 141/64 |
| 2002/0088168 A1 | 7/2002 | Tichenor |
| 2002/0117052 A1 | 8/2002 | Beers |
| 2002/0162915 A1 | 11/2002 | Mitani |

FOREIGN PATENT DOCUMENTS

| | | |
|---|---|---|
| WO | WO 00/00389 | 1/2000 |
| WO | WO 02/28714 A1 | 4/2002 |
| WO | WO 02/081032 A1 | 10/2002 |

* cited by examiner

GAS GENERATING SYSTEM AND METHOD FOR INERTING AIRCRAFT FUEL TANKS

CROSS REFERENCE TO RELATED APPLICATIONS

This application is a continuation of U.S. patent application Ser. No. 10/727,229, filed Dec. 2, 2003 now U.S. Pat. No. 7,081,153.

BACKGROUND OF THE INVENTION

The present invention generally relates to gas generation systems and particularly to systems and methods for nitrogen generation and for inerting aircraft fuel tanks.

Aircraft fuel tanks contain potentially combustible combinations of oxygen, fuel vapors, and ignition sources. The flash point for explosion varies according to temperature, pressure and fuel type. Industry literature suggests that a "limiting oxygen content" (LOC) immunizes a fuel tank from explosion, regardless of flash point factors. Industry standards suggest various limits for the LOC. For example, current standards suggest that the minimum amount of oxygen needed to sustain combustion at sea level is slightly less than 12%. That amount increases to 14.5% at 30,000 feet above sea level, Croft, John, "FAA 'Breakthrough': Onboard Inerting", *Aviation Week & Space Technology*, Jan. 6, 2003.

Attempts have been made to reduce the oxygen level in aircraft fuel tanks by providing fuel tank foam systems to arrest explosions. Drawbacks exist, however, in foam inerting systems, including displacement of approximately 3.5% of the volume of the tank and inefficiencies associated with mandatory removal of the foam for maintenance purposes. Other inerting systems include a nitrogen-generating system (NGS), which introduces nitrogen enriched air into the fuel tanks. Typically, an NGS passes compressed air from the engines through filters to separate out the nitrogen content, which is then piped into aircraft fuel tanks.

For example, U.S. Pat. No. 6,360,730 B1 to Koethe claims a method for inert loading of jet fuel by directly injecting an inerting agent into jet fuel while it is being loaded onboard an aircraft. U.S. patent application 20020162915 A1 to Mitani claims an environmental unit for an airplane wherein air of high-temperature and high-pressure is extracted from an engine or an auxiliary power portion of an airplane. The extracted air is regulated in temperature and pressure by an air conditioning portion and then the regulated air is supplied to a pressurized chamber, where the air exhausted from the pressurized chamber or air drawn out of the pressurized chamber is separated into air enriched with nitrogen and air enriched with oxygen. The air enriched with oxygen is supplied to the pressurized chamber again. The air enriched with nitrogen is supplied to the fuel tanks. The air enriched with oxygen is once again supplied to the pressurized chamber by making use of the circulation line of the auxiliary air conditioning portion.

The prior art inerting systems, however, have drawbacks, including a requirement for costly operational components. The components monopolize a predominance of the space and weight allowances for an aircraft, impeding overall system design. Further, redundant processes such as repetitive airflows into and from air conditioner components result in operational inefficiencies, again increasing the overall costs of such systems.

As can be seen, there is a need for an improved method and system for gas generating systems and methods. There is also a need for such a system to and method to minimize component requirements; to minimize process complexity; to optimize safety features; and to minimize structural and operational costs.

SUMMARY OF THE INVENTION

An aspect of the present invention includes a duct assembly; an air stream; a primary heat exchanger; a gas generating system heat exchanger; a first temperature sensor and a second temperature sensor; a controller monitor; a valve assembly; an air separation module (ASM) assembly having a primary module and at least one secondary module; at least one flow orifice; and a pressure sensor.

Another aspect of the present invention includes a duct assembly with a bleed air inlet and a ram air inlet for ducting an air stream; an air stream exit; a control loop system having at least one control loop, which may include a conduit for nitrogen transfer from the ASM assembly and a pressure sensor for determining pressure in the conduit and generating at least one pressure value corresponding to the pressure; and a conduit exit for transferring nitrogen enriched air (NEA) from the ASM assembly; a controller monitor for receiving a pressure value and selectively preventing nitrogen flow; a primary heat exchanger for receiving the air stream from the ducting assembly and cooling the air stream, the primary heat exchanger located downstream from the at least one bleed air inlet and located downstream from the at least one ram air inlet; a gas generating system heat exchanger for receiving the air stream from the duct assembly, cooling the air stream, and providing the air stream to the duct assembly; an ejector for drawing in air over the gas generating heater exchanger and for ejecting a portion of the air stream, the ejector mechanically associated with duct assembly; a filter for filtering contaminates from the air stream, the filter mechanically associated with the duct assembly; a first temperature sensor and a second temperature sensor, each for determining temperature in the duct assembly and generating a temperature value corresponding to the temperature, each temperature sensor mechanically associated with the duct assembly; a controller monitor for receiving a temperature value and a pressure value, and generating a corresponding command signal; a panel indicator for visual confirmation of component status, the panel indicator electronically associated with the controller monitor; an altitude rate switch for monitoring changes in altitude and sending a signal corresponding to the change to the controller; a valve assembly for receiving and responding to the command signal, the valve assembly including at least one valve selected from a group essentially comprising a pressure regulating and shutoff valve, check valve, a flow shutoff valve, an ejector shutoff valve, a thermal shutoff valve, an ASM shutoff valve, and an isolation valve); an air separation module (ASM) assembly having a primary module and at least one secondary module, each module for receiving the air stream from the duct assembly; separating nitrogen enriched air (NEA) from the air stream; and providing nitrogen to the duct assembly, the ASM assembly located downstream from the at least one temperature sensor; at least one flow control orifice for controlling receiving and regulating nitrogen flow from the ASM assembly via the duct assembly, the at least one flow control orifice associated with a portion of the duct assembly located downstream from the ASM assembly; and at least one NEA check valve associated with the duct assembly, the check valve for preventing entry of contaminants into the duct assembly.

Still another aspect of the present invention includes a duct assembly for ducting an air stream, with at least one bleed air inlet, at least one ram air inlet, and at least one air stream exit, a control loop system with a primary control loop and a secondary control loop; at least one pressure sensor for determining pressure in the conduit and generating at least one pressure value corresponding to the pressure; at least one conduit exit for transferring nitrogen enriched air (NEA); a controller monitor for selectively preventing NEA flow; a primary heat exchanger for receiving the air stream from the ducting assembly and cooling the air stream, the primary heat exchanger located downstream from the at least one bleed air inlet and located downstream from the at least one ram air inlet; a gas generating system heat exchanger for receiving the air stream from the duct assembly, cooling the air stream, and providing the air stream to the duct assembly; a first temperature sensor and a second temperature sensor, each temperature sensor for determining temperature in the duct assembly and generating a temperature value corresponding to the temperature, the temperature sensors mechanically associated with the duct assembly; a controller monitor for receiving a temperature value and a pressure value, and generating a corresponding command signal; a valve assembly for receiving and responding to the command signal, the valve assembly including at least one of the following: a pressure regulating and shutoff valve, a check valve, a flow shutoff valve, an ejector shutoff valve, a thermal shutoff valve, an ASM shutoff valve, and an isolation valve; an air separation module (ASM) assembly having a primary module and at least one secondary module, each module for receiving the air stream from the duct assembly; separating nitrogen enriched air (NEA) from the air stream; and providing the NEA to the duct assembly, the ASM assembly located downstream from the at least one temperature sensor; a primary flow shutoff valve for controlling NEA flow, the primary flow shutoff valve located downstream from the primary ASM and a secondary flow shutoff valve for controlling NEA flow, the secondary flow shutoff valve located downstream from the at least one secondary ASM; a primary flow control orifice and a secondary control orifice for controlling receiving and regulating NEA flow from the primary ASM and the at least one ASM, respectively, via the duct assembly, the primary flow control orifice and the secondary control orifice associated with a portion of the duct assembly located downstream from the ASM assembly; and a primary NEA check valve and a secondary NEA check valve for preventing entry of contaminants into the duct assembly, the primary NEA check valve and the secondary NEA check valve associated with the duct assembly.

Yet another aspect of the invention includes steps of ducting the air stream via a duct assembly with at least one bleed air inlet, at least one ram air inlet, and at least one air stream exit; receiving the air stream from the ducting assembly and cooling the air stream with a primary heat exchanger, the primary heat exchanger located downstream from the at least one bleed air inlet and located downstream from the at least one ram air inlet; receiving the air stream from the duct assembly with a gas generating system heat exchanger, cooling the air stream, and providing the air stream to the duct assembly; determining temperature in the duct assembly and generating a temperature value corresponding to the temperature via a first temperature sensor and a second temperature sensor, each temperature sensor mechanically associated with the duct assembly; receiving a temperature value and a pressure value, and generating a corresponding command signal via a controller monitor; receiving and responding to the command signal via at least one valve, the at least one valve selected from a group essentially comprising a pressure regulating and shutoff valve, a check valve, a flow shutoff valve, an ejector shutoff valve, a thermal shutoff valve, an ASM shutoff valve, and an isolation valve; receiving the air stream from the duct assembly, separating nitrogen enriched air (NEA) from the air stream, and providing the NEA to the duct assembly via an air separation module (ASM) assembly having a primary module and at least one secondary module, the ASM assembly located downstream from both temperature sensors; controlling NEA flow through the duct assembly from the ASM assembly to the conduit exit via the at least one flow control orifice, the at least one flow control orifice associated with a portion of the duct assembly located downstream from the ASM assembly; and preventing the entry of contaminants into the duct assembly from the conduit exit.

A further aspect of the present invention includes steps of ducting an air stream through a duct assembly with at least one bleed air inlet, at least one ram air inlet, at least one air stream exit, and a conduit exit; receiving the air stream from the duct assembly and cooling the air stream with a primary heat exchanger located downstream from the at least one bleed air inlet and located downstream from the at least one ram air inlet; receiving the air stream from the duct assembly, cooling the air stream, and providing the air stream to the duct assembly with a gas generating system heat exchanger; drawing air into a duct assembly and over the gas generating system heat exchanger via an ejector mechanically associated with duct assembly; filtering contaminates from the air stream via a filter, the filter mechanically associated with the duct assembly; determining temperature in the duct assembly and generating a temperature value corresponding to each determined temperature via a first temperature sensor and a second temperature sensor, the temperature sensors mechanically associated with the duct assembly; receiving a temperature value and a pressure value, and generating a corresponding command signal via a controller monitor; visually confirming component status via a panel indicator, the panel indicator electronically associated with the controller monitor; monitoring changes in altitude and sending a signal corresponding to the change to the controller via an altitude monitor; receiving and responding to the command signal via at least one valve, the at least one valve selected from a group essentially comprising a pressure regulating and shutoff valve, a check valve, at least one flow shutoff valve, an ejector shutoff valve, a thermal shutoff valve, an ASM shutoff valve, and an isolation valve; receiving the air stream from the duct assembly; separating nitrogen enriched air (NEA) from the air stream; and providing the NEA to the duct assembly via an air separation module (ASM) assembly having a primary module and at least one secondary ASM module, the ASM assembly located downstream from the at least one temperature sensor; controlling, receiving, and regulating NEA flow from the ASM assembly via the duct assembly and via at least one flow control orifice, the at least one flow control orifice associated with a portion of the duct assembly located downstream from the ASM assembly; and preventing entry of contaminants into the duct assembly via at least one NEA check valve associated with the duct assembly.

A still further aspect of the present invention includes steps of receiving in and venting the air stream via at least one orifice of a duct assembly, (the at least one orifice may include at least one bleed air inlet; at least one ram air inlet; at least one ram exit; and at least one ram air overboard exit); determining pressure in the duct assembly and generating a pressure value corresponding to the pressure via at least one pressure sensor; determining temperature in two points in the duct assembly and generating a temperature value corresponding to the determined temperature via a first temperature sensor and a second temperature sensor; receiving the pressure value and the temperature values, and generating at least one command based on the received values via a controller monitor, the at least one command generated to selectively control flow to portions of the duct assembly via a controller monitor; receiving the air stream from the ducting assembly and cooling the air stream via a primary heat exchanger, the primary heat exchanger located downstream from the at least one bleed air inlet and located downstream from the at least one ram air inlet; receiving the air stream from the duct assembly, cooling the air stream, and providing the air stream to the duct assembly via a gas generating system heat exchanger; receiving and responding to the command signal via at least one valve, the at least one valve selected from a group essentially comprising a pressure regulating and shutoff valve, a check valve, a flow shutoff valve, an ejector shutoff valve, a thermal shutoff valve, an ASM shutoff valve, and an isolation valve; receiving the air stream from the duct assembly; separating nitrogen enriched air (NEA) from the air stream; and providing the NEA to the duct assembly via an air separation module (ASM) assembly having a primary module and at least one secondary module, the ASM assembly located downstream from the temperature sensors; controlling NEA flow from the ASM assembly via a primary flow shutoff valve located downstream from the primary ASM and a secondary flow shutoff valve, the secondary flow shutoff valve located downstream from the at least one secondary ASM; receiving and regulating NEA flow from the primary module via a primary flow control orifice and receiving and regulating NEA flow from the at least one secondary module, the primary flow control orifice and the secondary control orifice associated with a portion of the duct assembly located downstream from the ASM assembly; and preventing entry of contaminants into the duct assembly via a primary NEA check valve located downstream from the primary flow control orifice and a secondary NEA check valve located downstream from the secondary flow control orifice; and transferring the NEA from the duct assembly via at least one conduit exit.

In a gas inerting system having a duct assembly with a conduit exit; a primary heat exchanger; a gas generating system heat exchanger; the gas generating system heat exchanger; a controller monitor; a valve assembly including a pressure regulating and shutoff valve mechanically associated with a portion of the duct assembly upstream from the primary heat exchanger and a thermal shutoff valve mechanically associated with a portion of the duct assembly downstream from the gas generating system heat exchanger; an air separation module (ASM) assembly having a primary module and a secondary module, the ASM assembly mechanically associated with a portion of the duct assembly upstream from the thermal shutoff valve; a flow control orifice; an NEA check valve and a control loop system, a further aspect of the present invention includes a redundant temperature control system with a first temperature sensor for determining temperature in the duct assembly and generating a first temperature value for the controller monitor; and a second temperature sensor for determining temperature in a portion of the duct assembly located upstream from the first temperature sensor and downstream from the ASM assembly and for generating a second temperature value. The controller monitor receives the first temperature value and the second temperature value, selectively closes the pressure regulating and shutoff valve based on the received first temperature value, and selectively closes the thermal shutoff valve based on the received second temperature value.

In a gas inerting system having a duct assembly with a conduit exit; a primary heat exchanger; a gas generating system heat exchanger; a first temperature sensor and a second temperature sensor; a controller monitor; a valve assembly including a pressure regulating and shutoff valve and a thermal shutoff valve; an air separation module (ASM) assembly having a primary module and a secondary module; a flow control orifice; and an NEA check valve, still another aspect of the present invention includes a cooling system with an ejector for drawing air into the duct assembly and over the gas generating system heat exchanger for cooling purposes.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a system and method for generating a gas from an air stream; for example, isolating nitrogen from an air mixture and providing the isolated nitrogen for use as an inerting agent. Unlike inventions of the prior art, which require a host of specific components and costly, redundant subprocesses, the present invention may utilize a minimal and flexible set of components as well as streamlined subprocesses, resulting in a cost-effective system and method.

More specifically, the present invention recovers nitrogen from an air stream, using the recovered nitrogen for inerting systems or other applications. For example, the present invention may utilize jet engine air that is otherwise vented overboard to produce nitrogen enriched air (NEA) for introduction into an ullage of a center wing fuel tank.

Figure 1:
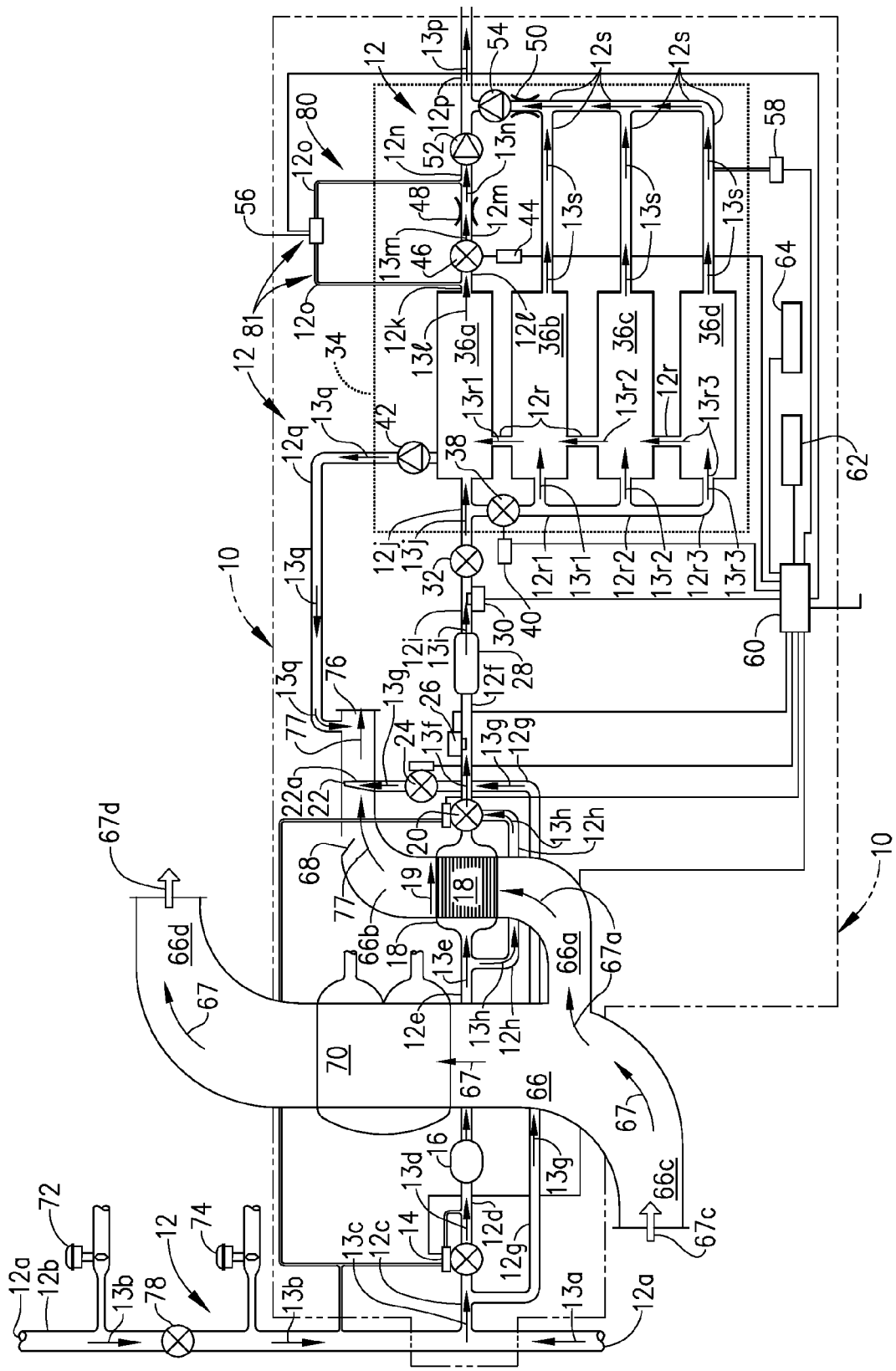
FIG. 1 is a schematic of an embodiment of a gas generating system, according to the present invention.

Referring now to the drawings, wherein similar reference characters designate corresponding parts throughout the drawings, and with reference to FIG. 1, there is shown an embodiment of gas generating system (GGS), shown generally at 10, according to an embodiment of the present invention. The GGS 10 may comprise, for example, a duct assembly 12 for pressurized air such as bleed air having inlets 12*a* and conduits 12*b*-12*t* for the pressurized air; a pressure regulating and shutoff valve (PRSOV) 14; an ozone/hydrocarbon converter 16; a gas generating system (GGS) heat exchanger 18; a heat exchanger bypass valve 20;

an ejector 22; an ejector shutoff valve 24; a first temperature sensor 26, such as a sensor or thermometer; a filter 28; a second temperature sensor 30, such as a sensor or thermometer; a thermal shutoff valve 32; an air separation module assembly (ASM assembly) 34 having air separation modules (ASM) 36a-d; an ASM shutoff valve 38; a third temperature sensor 40, such as sensor or thermometer; an OEA check valve 42, a flow control shut-off valve actuator 44, a flow control shutoff valve 46; a primary flow control orifice 48; a secondary flow control orifice 50; a primary NEA check valve 52; a secondary NEA check valve 54; a primary pressure sensor 56; a secondary pressure sensor 58; a controller monitor 60; an altitude rate switch 62; and a panel indicator 64.

Components operationally associated with the GGS 12 may include, for example, a ram air conduit 66 having passages 66a, 66b; ram inlet 66c; and ram exit 66d; a ventilation flap valve 68; a primary heat exchanger 70; an air conditioning system having a fan, such as a right-hand pack 72 or a left-hand pack 74; ram air overboard exit 76; and an isolation valve 78.

In various embodiments, control and monitoring functions of the GGS 10 may ensure temperature regulation of bleed air 13b entering the GGS 10 and selective shutoff of the bleed air supplies 13c, 13e and the air stream 13i to the ASM assembly 34 in the event of overtemperature and/or overpressure conditions. Typically, a cooling air such as ram air 67c may be used to cool bleed air 13a and 13b to temperatures acceptable for entry into the ASM assembly 34. Ram cooling flow 67c to the GGS 10 may flow in any mode of airplane operation.

Air stream sources (not shown) may enter at least one orifice of the GGS 10, including the bleed air inlets 12a as 13a, the ram air inlet 66c as 67c, and the ram air overboard exit 76 as 77. Portions of the duct assembly such as 66a and 66b may accommodate bi-directional flow of the air streams 77 and 67a, and venting of the air streams may be accomplished via various orifices, including the ram exit 66d as 67d and the ram air overboard exit 76 as 13q.

For example, during in-flight operations, cooling air such as ram air 67c naturally feeds the GGS 10. The ejector 22 may remain off in flight, and ram air 67c may be used to cool the bleed air 13a and 13b entering the GGS system 10. For example, ram air may feed the GGS system 10 by entering a cooling air or ram air inlet as 66c, travel through the ram air conduit 66 as 67, travel across the primary heat exchanger 70 as 67, and exit overboard via ram exit 66d as 67d.

For ground operations, however, ram air is not available for cooling bleed air 13a and 13b entering the GGS system 10, and heat sinking (cooling of the bleed air or other air stream) may be achieved by inducing a cooling airflow 13g through the GGS heat exchanger 18 by using a selectively operable motive device such as the ejector 22. In a non-limiting example, the ejector 22 may utilize bleed air (not shown) to induce ambient cooling air 67a through the GGS heat exchanger 18 for ground and low-speed flight operation because the ram air differential is insufficient to provide adequate cooling air to the GGS heat exchanger 18. The ejector 22 may be located downstream of the GGS heat exchanger 18. An array of uniformly-spaced converging nozzles 22a may be located at an inlet of the ejector 22. The nozzles 22a may provide a high-momentum (increasing) primary flow 13g to induce secondary, low-pressure flow 66a from the GGS heat exchanger 18 cold side. Each nozzle 22a may be supplied with bleed air from a feed tube (not shown) connecting each nozzle 22a with a bleed air manifold; i.e., a conduit for receiving the bleed air and conducting it to each nozzle 22a. Generally, the feed tubes (not shown) ensure an equal flow of bleed air (not shown) into each nozzle 22a with minimum pressure loss and ensure minimized drag and attendant pressure loss in the cold-flow side. For example, upon receiving a weight-on-wheels signal from the aircraft, the controller monitor 60 turns on the ejector shutoff valve 24 to energize the ejector 22 for heat sinking purposes, whereafter the ejector 22 may be fed high-pressure air (not shown) from a bleed air crossover duct (not shown) to a series of nozzles 22a, which then draw cooling air 13g into the conduit 12g, through the conduit 12d as airflow 13d and through the conduit 12e as airflow 13e, then into the GGS heat exchanger 18.

During maintenance checkout intervals, the GGS 10 may also be enabled by sending a signal from the controller monitor 60 to the PRSOV 14, which opens the PRSOV 14. Cooling airflows 13g and 67 may be provided by a selectively operable motive device such as the ejector 22 or by an ECS fan (not shown) respectively, the ECS fan located downstream from the heat exchanger 70 and directly upstream from the ram exit 66d. If, for example, simultaneous pack operation were desired, either the right-hand pack 72 or the left-hand pack 74 is turned on so as to induce airflow 77 via the ECS fan (not shown), backward through the GGS heat exchanger 18. Thus, once the ECS fan (not shown) is activated, the airflow 77 is drawn in via the ram air overboard exit 76 and drawn backwards through the GGS heat exchanger 18, and drawn as airflow 67a toward ram air conduit 66. Meanwhile, the ECS fan also draws in the airflow 67c via the ram inlet 66c. Both airstreams 67c and 77 are drawn together into airflow 67, and drawn through the heat exchanger 70 to flow as airflow 67d through the ram exit 66d. Although the airflow 77 may flow through the GGS heat exchanger 18 in the reverse direction from normal, this operation will have no effect on the performance characteristics of the GGS 10.

Regardless of the source of the air supply, once an air supply 13c reaches the conjunction of conduits 12c and 12g, the air stream 13c is passed to the PRSOV 14. The PRSOV 14 may provide a primary on/off functionality for the GGS 10. In addition, the PRSOV 14 may regulate air pressure to minimize the probability of providing excessive pressure (and resulting flow) to the GGS 10. The PRSOV 14, may include for example, an on/off solenoid (not shown). The PRSOV 14 may be actuated and may receive pressurized air from a source (not shown) connected to the bleed air inlets 12a. The solenoid (not shown) may then vent the PRSOV 14 upon receipt of a discrete signal given, for example, during ground operation or a cargo fire event. The PRSOV 14 may also be closed in case of an overtemperature detection or a shutdown signal from a controller source (not shown). For example, if the airflow 13j into the ASM assembly 34 is temperature-controlled at approximately 190° F., within an approximately 10° F. variance, airflow 13j is not expected to exceed 200° F. during steady state operation. If, however, airflow temperature exceeds the preselected setpoint, the controller monitor 60 may immediately close the PRSOV 14 to cut off the airflow 13c into the ASM assembly 34 and protect the GGS 10.

The PRSOV 14 may also provide downstream pressure regulation in the event of an overpressure condition. If the PRSOV 14 downstream pressure exceeds the desired pressure value, the PRSOV 14 may begin to regulate airflow 13c. The overtemperature functionality may be also accomplished via the thermal shutoff valve 32. The thermal shutoff valve may be located downstream of the GGS heat exchanger 18 and upstream of the ASM assembly 34. For example, a second temperature sensor 30, located immediately upstream of the thermal shutoff valve 32, may monitor temperature of an airflow 13i in the conduit at 12i. In the event of loss of temperature control, the second temperature sensor may provide a signal to the controller monitor 60 to shut down the PRSOV 14, may provide a signal to the controller monitor 60 to shutdown the thermal shutoff valve 32, or may provide signals to the controller monitor 60 to shutdown both.

After the air supply 13c passes through the PRSOV 14, it may pass via conduit 12d as airflow 13d to the ozone/hydrocarbon converter 16, which may comprise a catalyst formulation effective for hydrocarbon oxidation as well as ozone decomposition, preventing the harmful effects of ozone on component materials such as those found in the ASM assembly 34. The hydrocarbon oxidation may form carbon dioxide and water in quantities that do not affect the cabin environment.

The airflow 13e may then be routed via conduit 12e to the GGS heat exchanger 18. The GGS heat exchanger 18 may condition the hot, compressed bleed air 19 to a predetermined temperature prior to delivery to the ASM assembly 34. The GGS heat exchanger 18 may also prevent hot bleed air 19 from entering the aircraft fuel tank (not shown) in case of system failures of various types.

As the hot compressed bleed air 19 is present in the GGS heat exchanger 18, ram air (not shown), also present in the GGS heat exchanger 18, may function as a heat sink. Once the cooled air 13f has been drawn across the GGS heat exchanger 18, and into the conduit 12f, the first temperature sensor 26 may sense the air temperature and compare it against a preselected temperature setting, for example, a temperature control setpoint of 190° F., with a control band of approximately 10° F. If the first temperature sensor 26 determines that the sensed temperature falls outside a predetermined range, the first temperature sensor 26 may send a signal to the controller monitor 60. Upon receiving said signal, the controller monitor 60 may generate a command signal to control the heat exchanger bypass valve 20, closing the valve and stopping the flow of air from the GGS heat exchanger 18 to conduit 12f. It is contemplated that the first temperature sensor 26 may comprise various designs and constructs; for example, a mixing thermostat (not shown). The first temperature sensor 26 may work in conjunction with the heat exchanger bypass valve 20, which may pass a part of the airflow 13h around the GGS heat exchanger 18 via conduit 12h to control the air input into the air separation module assembly 34, resulting in improved control, system stability, and improved response time.

Once the air 13f passes the first temperature sensor 26, it may enter the filter 28, which may coalesce particulate and aerosol matter that may be present. For example, the filter 28 may capture dust, sand particles, oil, hydraulic fluid, and water, thus preventing excessive contamination buildup within the ASM assembly 34, which would otherwise result in lower flow and undesirable oxygen levels in the NEA.

After filtering, the air 13i may travel down the conduit 12i to devices such as the second temperature sensor 30 and the thermal shutoff valve 32, which may be used to shut down the GGS 10 operation in the event of, for example, loss of temperature control. Such a shutdown may prevent catastrophic events. For example, the second temperature sensor 30 may provide a signal for the controller monitor 60 to shut down the PRSOV 14 in the event of loss of temperature control.

In the event that the PRSOV 14 is unable to shutdown, the thermal shutoff valve 32 may automatically shut off flow to the ASM assembly 34. Once the temperature of the air 13i exceeds a predetermined trigger point, the thermal shutoff valve 32 may automatically close and may be reset during, for example, ground maintenance. After passing through the thermal shutoff valve 32, the air 13j reaches the ASM assembly 34 via the conduit 12j.

The ASM assembly 34 may include one or more ASMS, shown in FIG. 1 as ASMs 36a-d, each of which may comprise various designs, components, and constructs, as noted by one skilled in the art. In one example, the ASM assembly 34 may comprise a minimal complement of components that increases reliability; requires minimal electrical power; and may run continuously and autonomously. Each ASM may separate from the air one or more streams of predefined gases; for example, nitrogen enriched air (NEA).

In various embodiments, the ASMs may include a primary ASM 36a and one or more (a series of) secondary ASMs 36b-d. The secondary ASMs, such as ASMs 36b-36d, may operate in parallel, depending on airflow requirements and overall aircraft design requirements and constraints. For example, as the airflow 13j may enter into the primary ASM 36a for full-time operation and portions of the airflow 13j may be diverted to airflow 13r via conduits 12r during high-flow (descent) operations. The airflow 13r may be separated into airstreams 13r1, 13r2, and 13r3 for entry into respective secondary ASMs 36b-d via respective conduits 12r1-3. Entry of the airstreams 13r1-13r3 into respective secondary ASMs 36b-36d is generally accomplished in close temporal proximity, thus providing approximately parallel nitrogen-separation operations in each secondary ASM 36b-36d.

Upon exiting the primary ASM 36a, the NEA flow 13l may flow through the flow shutoff valve 46, then via conduit 12m and NEA flow 13m to the flow control orifice 48, which may regulate flow of the NEA 13m, completely or partially restricting the flow of NEA during climb and cruise operations of the aircraft (conservation mode) or increasing the NEA flow 13m during descent operations of the aircraft. The NEA flow 13m may then enter check valve 52, which may prevent backflow of contaminants into the ASM assembly 34, then flowing as 13p to exit the GGS 10 via conduit exit 12p. Upon exit, the NEA may be provided to, for example, a center wing fuel tank (not shown) for inerting purposes.

All or a portion of the NEA flow 13l may also be ducted circuitously through a control loop system 80 having the primary control loop 81 comprising, for example, conduit 12o and the primary pressure sensor 56. The NEA flow 13o passes through conduit 12o, wherein the pressure may be sensed by the primary pressure sensor 56. The primary pressure sensor 56 may send a signal to the controller monitor 60, which, in turn, may actuate the flow control shutoff valve 46, the flow primary flow control orifice 48, or both, thus determining the direct or circuitous routing of the NEA to the conduit 12n as NEA flow 13n, for onward transfer via conduit exit 12p as NEA flow 13p.

As NEA flow 13p passes to the center wing fuel tank (not shown) via conduit 12p, the altitude rate switch 62 may determine that a descent has been initiated and may signal the controller monitor 60, which may actuate the primary NEA check valve 52, allowing a high flow rate of NEA to the ullage space of the center wing fuel tank (not shown). The primary NEA check valve 52 may prevent fuel vapors or splash back from entering equipment upstream thereof. The primary NEA check valve 52 may also prevent a back flow of air through the primary ASM 36a during conservation mode, protecting it and guarding against contamination of other standard or optional equipment.

The altitude rate switch 62 may function in conjunction with the controller monitor 60 by determining altitude of the aircraft and signaling the controller monitor 60 accordingly. During conservation mode, only a small amount of extremely pure NEA 13$p$ (low oxygen content) may be provided to an ullage space, thereby reducing the ullage oxygen concentration during cruise operations, which ultimately reduces the NEA requirements during descent.

The remaining airflow 13$t$ (absent the NEA) may be vented from the primary ASM module 36$a$ through conduit 12$t$, through the OEA check valve 42 and via conduit 12$q$ (airflow 13$q$) to the ram air overboard exit 76. The OEA check valve 42 may prevent back flow or back splash of contaminants into the ASM assembly 34.

A portion or all of the airflow 13$j$ entering the ASM assembly 34 may also be directed to the secondary ASMs 36$b$-36$d$ via conduit 12$j$ and the ASM shutoff valve 38, which may conserve the air by shutting off any and all ASMs not required during, for example, climb and cruise phases of a flight profile. During such phases only the primary ASM 36$a$ may be operational. A trickle flow 13$r$ to the secondary ASMs 36$b$-36$d$ may be permitted to maintain a near operating temperature in the secondary ASMs 36$b$-36$d$ when closed.

The altitude switch 62 may control the ASM shutoff valve 38 by sensing descent, and, in response, energizing it. After exiting the ASM shutoff valve 38, the airflow 13$r$ may enter into the secondary ASMs 36$b$-36$d$ via conduits 12$r$1-12$r$3 as airflows 13$r$1-13$r$3, respectively. Optionally, the third temperature sensor 40 may operate in conjunction with the ASM controller monitor 60 to sense over-temperature conditions in the airflow 13$r$ and effect closure of the ASM shutoff valve 38.

After air separation in the secondary ASMs 36$b$-36$d$, the NEA 13$s$ may flow via 12$s$ to the secondary flow control orifice 50, the secondary check valve 54, and to the center wing fuel tank (not shown) via conduit 12$p$ as NEA flow 13$p$. It is contemplated that the secondary flow control orifice 50 and the secondary NEA check valve 54 will provide functionality similar to that described for the primary flow control orifice 48 and the primary NEA check valve 52, respectively. Airflow 13$t$ other than the separated NEA may exit the secondary ASMs 36$b$-$d$ via conduit(s) 12$t$ and the pass through the OEA check valve 42 for venting as airflow 13$q$ via conduit 12$q$ and the ram air overboard exit 76.

Figure 2:
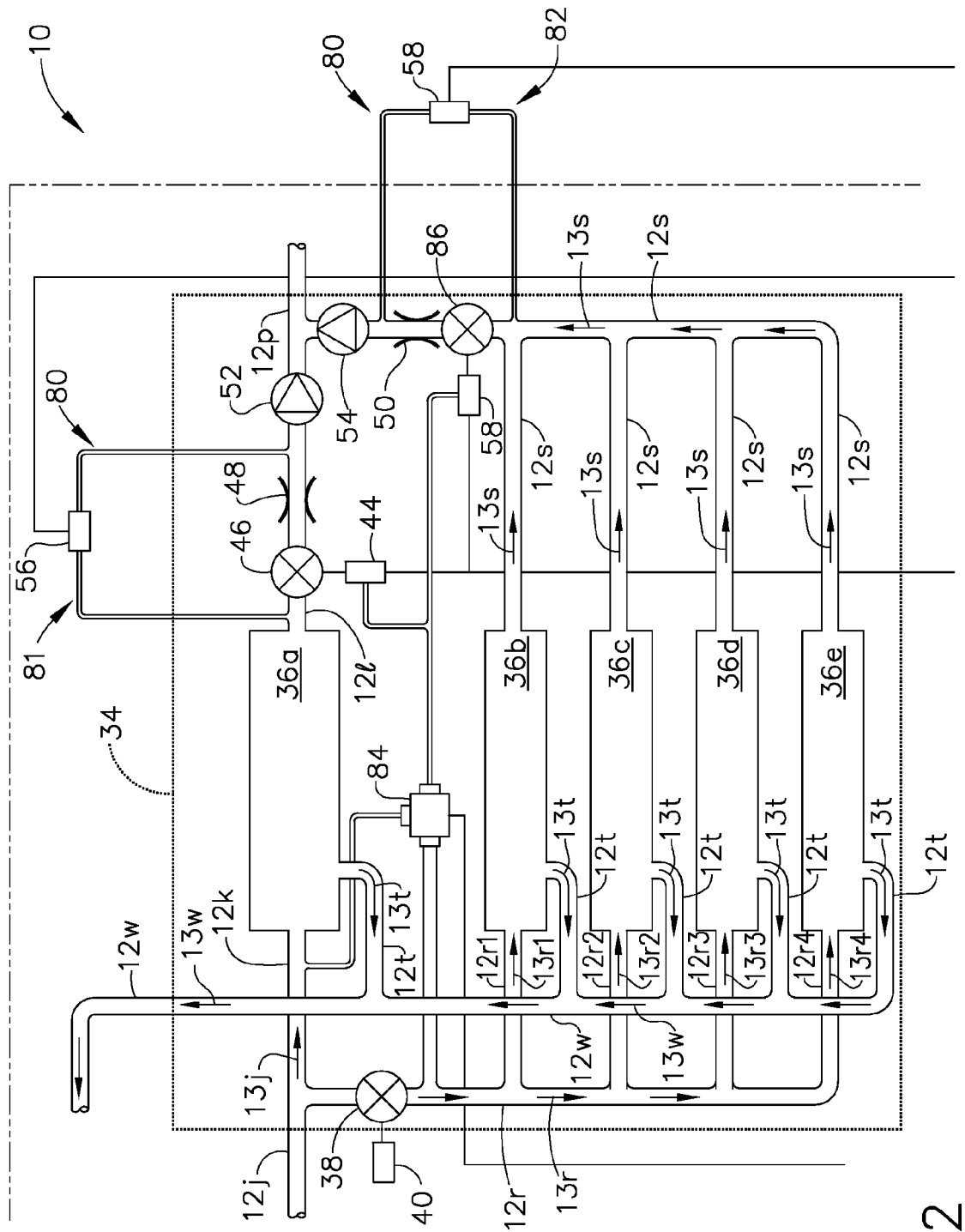
FIG. 2 is a schematic of an alternate embodiment of an air separation module assembly of the gas generating system of FIG. 1, according to the present invention.

Turning now to FIG. 2, there is shown an alternate embodiment of the ASM assembly 34 of FIG. 1 having in addition to the primary control loop 81, a secondary control loop 82 and an additional ASM module 36$e$, where the primary control loop 81 and the secondary control loop 82 comprise the control loop 80. The addition of the ASM module 36$e$ merely illustrates one of the possible designs for the ASM assembly 34 and may be utilized, for example, in relatively large aircraft requiring relatively high NEA output. The addition of the second control loop 82 provides a redundancy in pressure regulation and control of the NEA flow 13$s$ by inclusion of a control loop dedicated specifically to the NEA output 13$s$ of the secondary ASMs 36$b$-36$e$.

In the alternate embodiment of FIG. 2, the airflows 13$r$1-4 may enter the secondary ASMs 36$b$-36$e$ via the conduits 12$j$ and 12$r$1-4. After gas separation in the secondary ASMs 36$b$-36$e$, the NEA flow 13$s$ may be ducted directly to the center wing fuel tank (not shown) via conduits 12$s$, a secondary flow control valve 86, the secondary flow control orifice 50, and the secondary NEA check valve 54. Alternatively, the NEA flow 13$s$ may be ducted via 12$s$ to the secondary control loop 82 that may provide redundant functionality to that of the first control loop 81.

The three-way solenoid 84 may function in conjunction with one or more sensors, such as the third temperature sensor 40, the flow control sensor 46, and the secondary flow control sensor 88 to actuate one or more valves such as the ASM shutoff valve 38, the primary flow control valve 46, and the secondary flow control valve 86.

Air 13$t$ other than the NEA may exit the primary ASM 36$a$ and the secondary ASMs 36$b$-$e$ via conduits 12$t$, and vented as air 13$w$ overboard via conduit 12$w$.

Figure 3:
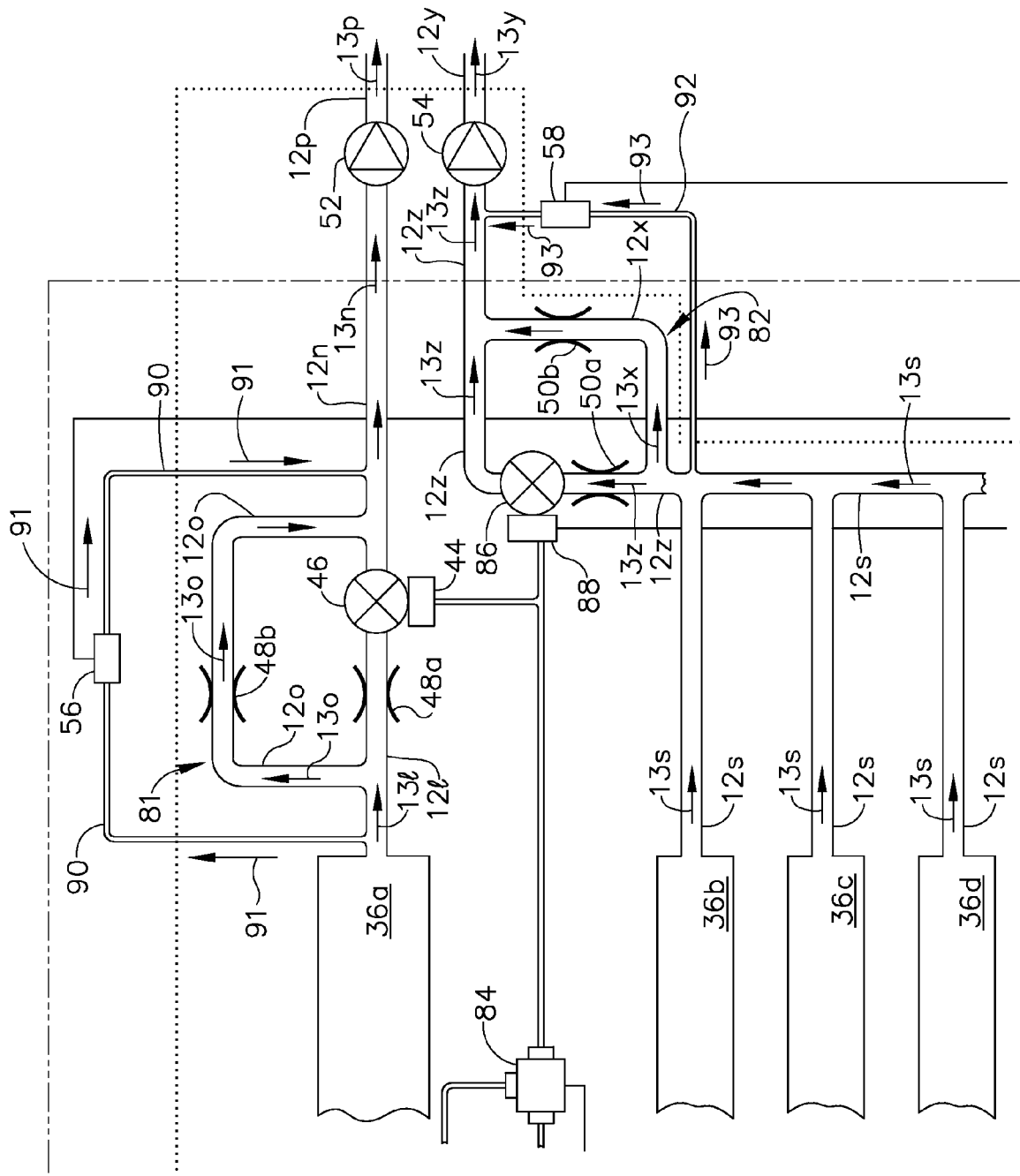
FIG. 3 is an alternate embodiment of a control loop system of the air separation module assembly system of FIG. 2, according to the present invention.

Turning now to FIG. 3, there is shown an alternative embodiment of a control loop system 80 of FIG. 2, wherein each control loop 81, 82 has an independent pressure conduit and an independent conduit exit; namely, primary conduit exit 12$p$, secondary conduit exit 12$y$, primary pressure conduit 90 and secondary pressure conduit 92. The inclusion of the primary pressure conduit 90 and the secondary pressure conduit 92 may provide additional pressure regulation and control functionality for the ASM assembly 34. The inclusion of the primary conduit exit 12$p$ and the secondary conduit exit 12$y$ may provide redundant inerting capabilities via redundant NEA flow 13$p$ and 13$y$, thus ensuring an NEA flow to the center wing fuel tank (not shown) in case of a control loop failure.

After exiting the primary ASM 36$a$, the NEA flow 13$l$, 13$n$, 13$p$ may be ducted directly to the center wing fuel tank (not shown) via conduit 12$l$, a flow control orifice 48$a$ (functionally the same or similar to the flow control orifice 48 of FIGS. 1 and 2), the conduit 12$n$, the check valve 52, and finally the primary conduit exit 12$p$.

Alternatively, all or a portion of the NEA flow 13$l$ may be ducted through the primary control loop 81 via 12$o$ as NEA flow 13$o$ through a flow control orifice 48$b$ (functionally the same or similar to the flow control orifice 48 of FIGS. 1 and 2), through 12$n$ as NEA flow 13$n$, through the NEA check valve 52, and to the center wing fuel tank via the primary conduit exit 12$p$ as NEA flow 13$p$. As previously described, the flow control shut-off valve actuator may operate in conjunction with the controller monitor (shown as 60 in FIG. 1) to sense or measure flow and signal the controller monitor 60 which, in turn, may actuate closure or opening of the flow control shutoff valve 46.

The NEA may also be ducted via primary pressure conduit 90 as NEA flow 91 and the primary pressure sensor 56, which may operate in conjunction with the controller monitor (shown as 60 in FIG. 1) to gauge pressure and regulate flow. The NEA flow 91 may then be ducted via conduit 12$n$ as NEA flow 13$n$, exiting to the center wing fuel tank (not shown) via the NEA check valve 52 and the primary conduit exit 12$p$ as NEA flow 13$p$.

The secondary control loop 82 may be functionally similar to the primary control loop 81. For example, the secondary control loop 82 may receive NEA flow 13$s$ via conduit 12$z$ (NEA flow 13$z$) and duct the NEA directly to the center wing fuel tank (not shown) via a flow control orifice 50$a$, which may regulate flow of the NEA, and the check valve 52, and finally, as NEA flow 13$y$, may be ducted to the center wing fuel tank (not shown) via the second conduit exit 12$y$.

Alternatively, all or a portion of NEA flow 13$s$ may be ducted through secondary control loop 82 via conduit 12$x$ as NEA flow 13$x$ through a flow control orifice 50$b$ for flow regulation, through conduit 12$z$ as NEA flow 13$z$ through NEA check valve 54, then exit to the center wing fuel tank (not shown) as 13y via the secondary conduit exit 12y. As previously described, the flow control sensor 88 may operate in conjunction with the controller monitor (shown as 60 in FIG. 1) to sense or measure flow and signal the controller monitor (shown as 60 in FIG. 1) which, in turn, may actuate closure or opening of the flow control shutoff valve 86.

The NEA flow 13s may also be ducted via secondary pressure conduit 92 as NEA flow 93 and the secondary pressure sensor 58, which may operate in conjunction with the controller monitor (shown as 60 in FIG. 1) to gauge pressure and regulate flow. The NEA flow 93 may then be ducted via conduit 12z as NEA flow 13z, exiting to the center wing fuel tank (not shown) via the NEA check valve 54 and the secondary conduit exit 12y as NEA flow 13y.

It should be understood, of course, that the foregoing relates to preferred embodiments of the invention and that modifications may be made without departing from the spirit and scope of the invention as set forth in the following claims.

The invention claimed is:

1. A gas generating system for an aircraft comprising:
   a duct assembly having:
   a first conduit for ram air;
   a first heat exchanger for receiving an air stream of pressurized air and cooling the air stream, the first heat exchanger located within the first conduit and optimized for cooling the pressurized air with ram air;
   a second conduit for cooling air;
   a second heat exchanger located within the second conduit for receiving the air stream of pressurized air and cooling the air stream with a selectively induced cooling air flow when ram air is not available;
   a temperature sensor for determining temperature of the air stream and generating a temperature value corresponding to the temperature, the temperature sensor mechanically associated with the duct assembly;
   a controller monitor for receiving a temperature value, and generating a corresponding command signal;
   a control device for receiving and responding to the command signal, the control device selected from the group consisting of a pressure regulating and shutoff valve, check valve, a flow shutoff valve, an ejector shutoff valve, a thermal shutoff valve, an ASM shutoff valve, a fan, and an isolation valve;
   an air separation module (ASM) assembly for receiving the air stream from the duct assembly; separating nitrogen enriched air (NEA) from the air stream; and providing the NEA to the duct assembly, the ASM assembly located downstream from the temperature sensor;
   a flow control orifice for controlling receiving and regulating NEA flow from the ASM assembly via the duct assembly, the flow control orifice associated with a portion of the duct assembly located downstream from the ASM assembly; and
   an NEA check valve for preventing entry of contaminants into the ASM assembly, the NEA check valve located downstream from the flow control orifice.

2. The system of claim 1, further comprising an ozone separator positioned to receive the air stream and separate ozone from the air stream.

3. Apparatus for providing nitrogen enriched air to an aircraft fuel tank which comprises:
   a first conduit for conveying bleed air from an engine of the aircraft through at least one air separation module (ASM);
   a second conduit for conveying ram air across a heat exchanger, which heat exchanger cools the bleed air conveyed in the first conduit;
   an ozone separator positioned in the first conduit:
   a temperature sensor positioned in the first conduit downstream from the ozone separator;
   the temperature sensor being interconnected with a flow control device controlling flow of ram air through the heat exchanger responsively to temperature change of the bleed air produced within the ozone separator; and
   an air separation module (ASM) assembly for separating nitrogen enriched air (NEA) from the bleed air, the ASM assembly located downstream from the temperature sensor.

4. The apparatus of claim 3 further comprising:
   a catalytic hydrocarbon separator positioned upstream from the temperature sensor;
   wherein the ozone separator is a catalytic ozone separator; and
   wherein the temperature sensor is responsive to heat produced by the catalytic ozone separator and the catalytic hydrocarbon separator.

5. A method for generating nitrogen enriched air from a bleed air stream of an aircraft, the method comprising the steps of:
   ducting the bleed air stream via a duct assembly having:
   a bleed-air stream inlet;
   a ram air inlet;
   an inlet for selectively induced cooling air;
   receiving the bleed air stream into the duct assembly;
   cooling the bleed air stream with ram air flowing through the ram air inlet during normal flight of the aircraft;
   cooling the bleed air stream with cooling air flowing through the inlet for selectively induced cooling air during ground operation of the aircraft;
   providing a cooled bleed air stream to the duct assembly;
   determining temperature in the duct assembly and generating a temperature value corresponding to the temperature via a temperature sensor the temperature sensor mechanically associated with the duct assembly;
   receiving a temperature value, and generating a corresponding command signal via a controller monitor;
   receiving and responding to the command signal via a valve, the valve selected from a group essentially comprising a pressure regulating and shutoff valve, check valve, a flow shutoff valve, an ejector shutoff valve, a thermal shutoff valve, an ASM shutoff valve, and an isolation valve;
   receiving the air stream from the duct assembly, separating nitrogen enriched air (NEA) from the air stream, and providing the NEA to the duct assembly via an air separation module (ASM) assembly having a primary module and a secondary module, the ASM assembly located downstream from the temperature sensor;
   controlling NEA flow through the duct assembly from the ASM assembly to the conduit exit via a flow control orifice, the flow control orifice associated with a portion of the duct assembly located downstream from the ASM assembly; and
   preventing the entry of contaminants into the duct assembly from the conduit exit.

6. The method of claim 5, further comprising a step of catalytically removing hydrocarbons and ozone from the bleed air stream.

* * * * *